FIP8102 XR 3,234,333

SUBSTITUTE FOR MISSING COPY

Feb. 8, 1966 C. A. GUDER 3,234,333

HYBRID PHONE PATCH

Filed Aug. 24, 1962 2 Sheets-Sheet 1

INVENTOR.
CHARLES A. GUDER
BY
Stone, Nierman, Burmeister & Zummer
ATTORNEYS.

Feb. 8, 1966 C. A. GUDER 3,234,333

HYBRID PHONE PATCH

Filed Aug. 24, 1962 2 Sheets-Sheet 2

INVENTOR.
BY CHARLES R. GUDER
Stone, Nierman, Burmeister & Zummer
ATTORNEYS 3,234,333
Patented Feb. 8, 1966

3,234,333

HYBRID PHONE PATCH

Charles A. Guder, Sudbury, Mass., assignor to Waters Manufacturing, Inc., Wayland, Mass., a corporation of Massachusetts Filed Aug. 24, 1962, Ser. No. 219,151
16 Claims. (Cl. 179—6)

This invention has as its principal object the provision of an improved hybrid coupling device adapted for use in conjunction with radio receiving and transmitting apparatus for the purpose of patching-in or interconnecting additional, auxiliary or ancillary equipment and circuits cooperable therewith, and more specifically an improved phone patch, which effects interconnection between the usual telephone line and subscriber's set (subset) and the receiver and transmitter of a radio station in a manner permitting direct two-way communication over both transmission paths.

The hybrid coupler presently disclosed affords a very compact and versatile unit which is readily connected with existing equipment at the radio station and which is capable of making not only the standard phone patch, but a number of needed additional interconnections between a tape recorder and the station equipment for operation to record and play back both sides of conversations derived from either the telephone line or the radio station, the hybrid coupler being further characterized by the provision of a single switching control effective to quickly shift from one to another of a choice of six operating arrangements, including taping of the station communications to record both sides of radio conversations; recording conversations to and from the telephone line; playing back recordings to the telephone line or to the radio transmitter; and patch-recording both the radio station and the telephone line concurrently so that speech received from the remote party on the telephone line will modulate the radio transmitter, and the output of the radio receiver will be transferred to the telephone line, thus recording the entire two-way telephone-to-radio conversation, one of said switching choices including a normal or "off" condition restoring the patches and station equipment instantly to normal condition for independent operation in the ordinary manner.

The flexibly-selective and stable operating capabilities of the novel coupler derive from the provision of an improved hybrid or bridge-isolation network comprising a pair of transformers connected in an especially contrived combination with a bridging transformer and certain resistive terminating and balancing elements and selective switching means all cooperable to effect an adjustable, stable impedance match and null-balance between the variously interconnectible patch components and the transmission line, in a manner and by circuit means more particularly described hereinafter in view of the annexed drawings, in which:

Figure 2:
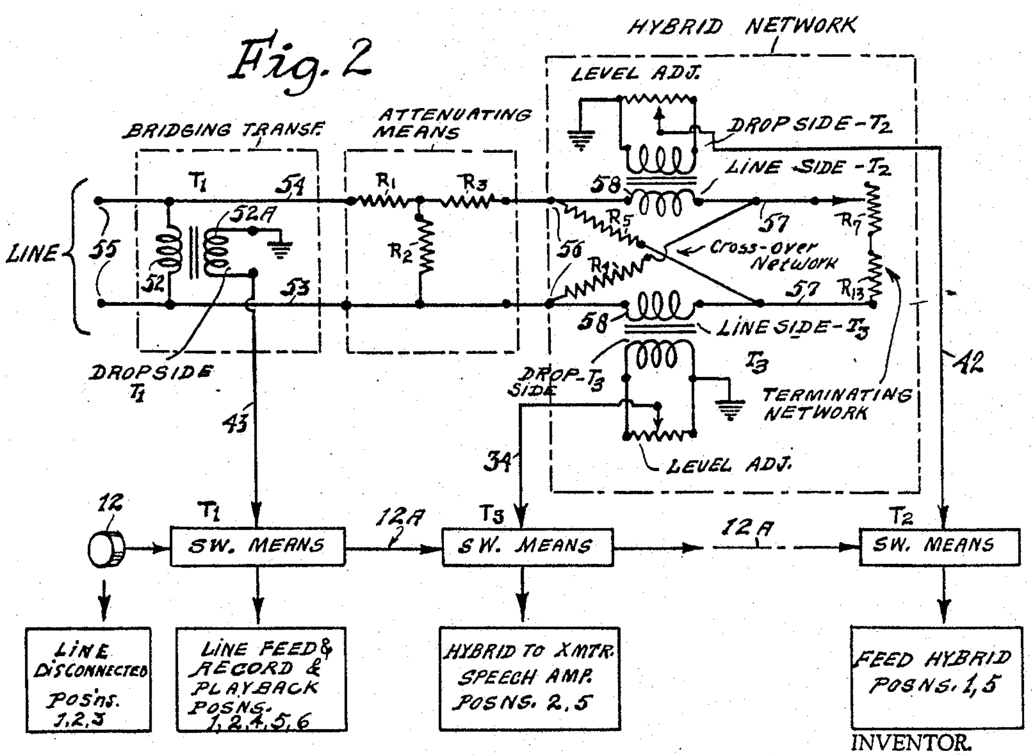
FIG. 2 is an explanatory functional schematic illustrating the hybrid network separately from the switching and line equipment.

Prefatory to the description of the complete operating circuit, the general functional aspects of the hybrid network are first explained in view of FIG. 2, wherein the line input to the network is represented by terminals 55 across which the line side or winding 52 of a bridging transformer $T_1$ is connected, one terminal of the drop side 52A of this transformer being connected to the common ground, as shown, and the remaining terminal thereof being extended via conductor 43 to the switching means represented by the correspondingly labeled block.

The connection from the line input terminals 55 is extended via conductors 53 and 54 and an attenuating means in the form of resistors $R_1$, $R_2$, and $R_3$ arranged in a T-pad configuration, to the line terminals 56 of the line side or windings of a pair of hydbrid-connected transformer $T_2$ and $T_3$, the respective remaining terminals of which connect via conductors 57 with an adjustable terminating reistance consisting of the series-connected resistors $R_7$ and $R_{13}$, the former of which is variable for the purpose of establishing a balancing null to prevent cross-talk from the radio receiver output to the speech amplifier or input of the transmitter, cooperably with the action of a cross-over network in the form of a pair of resistors $R_4$ and $R_5$ respectively shunting around each of the line windings of the hybrid coils and the terminating network resistors $R_7$ and $R_{13}$ in the cross-over configuration shown to form a Wheatstone bridge preventing transfer of energy between the receiver transformer and the transmitter transformer, while the line terminals 55 are coupled to both, the T-pad and line forming an arm of the bridge.

Figure 3:
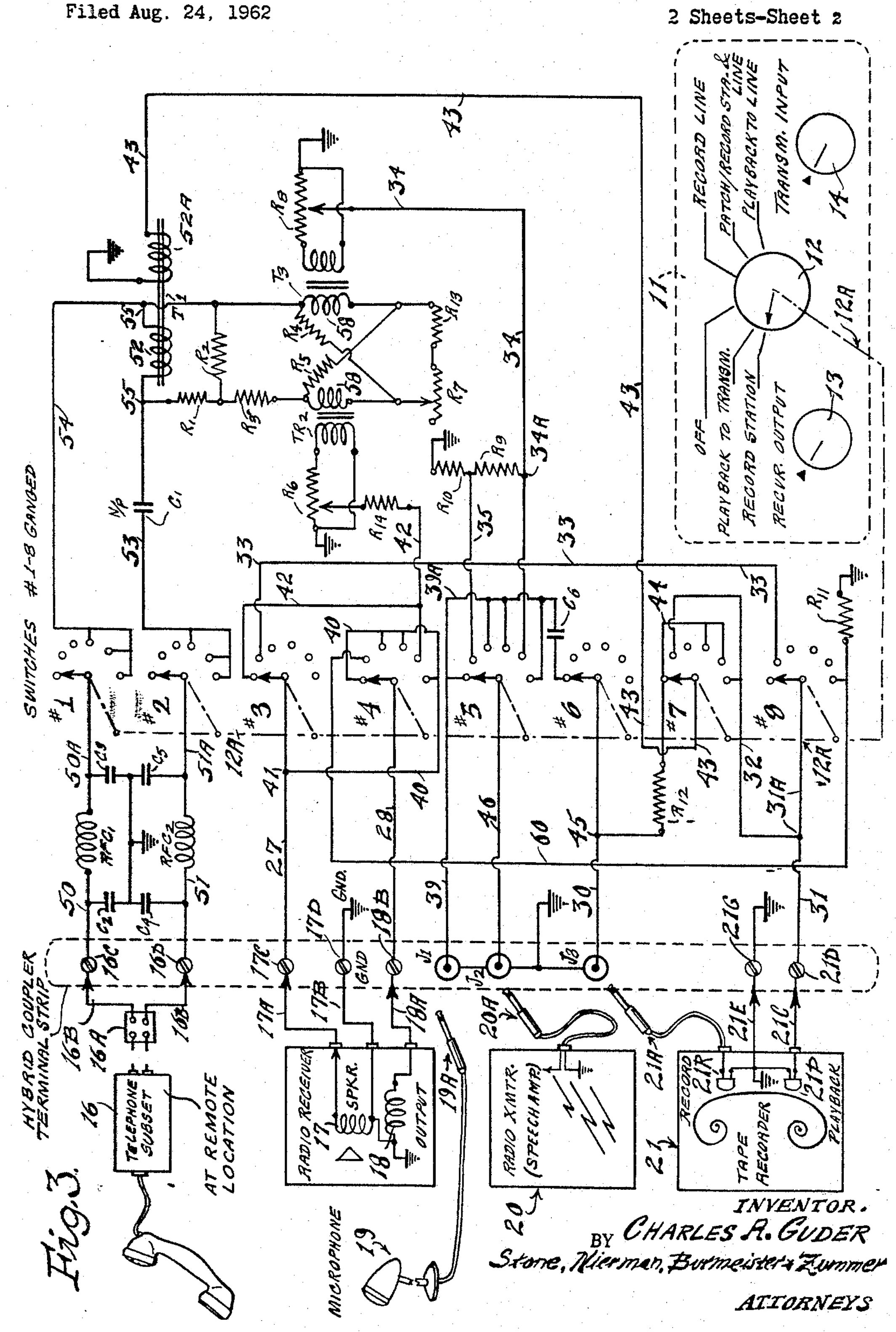
FIG. 3 is a circuit diagram showing the hybrid coupler connected with station equipment and various patching components in a typical operating arrangement.

The respective drop sides or windings 58 of the two transformers $T_2$ and $T_3$ are provided with level control adjustment means more particularly referred to hereafter in conjunction with the detailed circuit description of FIG. 3, connections from these drop windings being respectively extended to the switch means via conductors 34 and 42.

In general, the bridging transformer serves to connect the tape recorder for recording the playback in positions 1, 2, 4, 5, and 6 of the selector switch means, while the transformer $T_2$ feeds the network in positions 1 and 5, and transformer $T_3$ transfers energy from the network to the speech input of the transmitter in positions 2 and 5, the telephone line being connected in positions 4, 5, and 6.

The complete hybrid circuit comprising the bridging transformer, hybrid-connected transformers, and the resistive networks makes it possible to achieve one of the particularly unique and valuable features of the coupler, namely, the ability to permit normal independent operation of the radio equipment disconnected from the telephone line with the hybrid network in effect standing in open-circuit condition while the recorder is operatively connected to the line, in accordance with the more detailed connections and operations next described.

Figure 1:
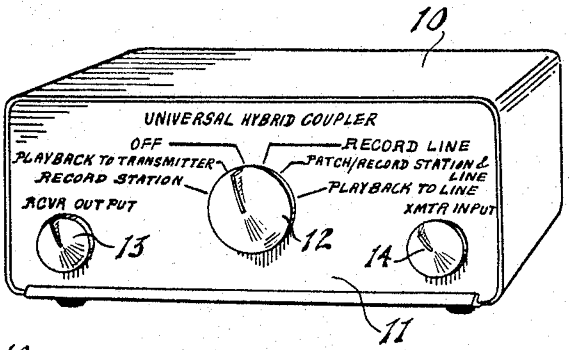
FIG. 1 is a perspective of the hybrid coupler unit viewed from the front.

In a preferred embodiment, as depicted in FIG. 1, the novel hybrid coupling means is compactly housed in a small cabinet 10 having a front panel 11 on which are disposed three control knobs 12, 13, and 14, the central knob 12 being the principal control and actuating a patch-selection switching means, while the knobs 13 and 14 respectively control the output level from the radio receiver and the input level to the radio transmitter or speech amplifier thereof and, once set, should require only infrequent attention, as will more fully appear hereinafter.

Figure 1A:
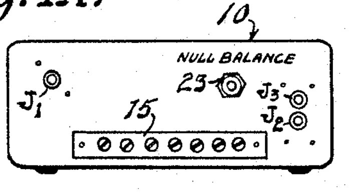
FIG. 1A is an elevational view to reduced scale of the rear of the unit shown in FIG. 1 illustrating the disposition of the patching terminal strip and jacks, and the null adjustment.

Connections to the coupler from the various patching components, such as the telephone subscriber's set (and thus through the phone line to a remote telephone), radio receiver and transmitter, microphone, and tape recorder, will be extended to terminals on the strip 15 and to the jacks $J_1$, $J_2$, and $J_3$, all disposed, along with a null-balancing adjustment means 23, at the rear of the cabinet 10, as shown in FIG. 1A, such connections being more particularly described hereafter in view of FIG. 3.

The complete circuit components and switching means comprising the hybrid coupler are depicted schematically in FIG. 3 in a grouping located at the right-hand side of the terminal strip 15, which corresponds in essence to the terminal strip seen on the back of the cabinet 10 in FIG. 1A, with the difference that in FIG. 3 the jacks $J_1$, $J_2$, and $J_3$ have been grouped for convenience with the strip terminals, the auxiliary and the patch-connected components being grouped on the opposite or left-hand side of the terminal strip and including: a telephone subset 16 at some remote location (the set at the station not being illustrated) connected by conductors 16B from a local terminal block 16A to strip terminals 16C and 16D; the voice coil 17 of the speaker for the radio receiver connected by conductors 17A, 17B to strip terminals 17C and 17D, the latter terminal being connected to a common ground return in the coupler; the output transformer secondary 18 of the radio receiver, one terminal of which is grounded and the other terminal of which is extended via conductor 18A to the strip terminal 18B; a microphone 19 connected by cord and plug means 19A to the microphone jack $J_1$, one terminal or sleeve side of which is connected to common ground in the coupler; the radio transmitter 20, the speech input side or amplifier of which is connected by patch cord and plug means 20A to the transmitter jack $J_2$; and a tape recorder 21, the input portion of which is represented schematically as the recording head 21R, connected by means of the cord and plug 21A to recording jack $J_3$, while the output or playback portion represented schematically by the playback head 21P connected to strip terminal 21D via conductor 21C with the return circuit for both heads completed via conductor 21E to the grounded strip terminal 21G, it being understood that such tape recorders normally include suitable amplifying means (not shown) for both heads.

The various patching circuits and interconnections with the hybrid network are established by a plurality of gang-operated selector switches, designated #1 to #8, inclusive, in FIG. 3, each such switch having six stationary contacts corresponding respectively to the six circuit-patching selections which the illustrative embodiment described is capable of effecting in accordance with the designations on the schematic representation of the control panel 11 outlined in dotted lines in FIG. 3, the switches being ganged as indicated by the dashed lines 12A and being shown in the first (clockwise) position in FIG. 3, which position corresponds to the "Record Station" selection designated on panel 11.

The various circuit arrangements corresponding to the six selections available will be described in order hereafter, it being observed that the first three contacts of the two phone-line switches #1 and #2 are without connection and wholly dead, so that in the corresponding first three positions of the selector switch knob 12, the phone line is disconnected.

FIRST POSITION

*"Record station"*

The designation of this position signifies that it connects the tape recorder for recording both reception and transmission of the radio station, it being understood that the transmitter will usually be equipped with suitable on-off control means in the form of a press-to-talk switch or automatic voice-operated relay for switching the transmitter into and out of effective service.

Assuming that the station is receiving, the received signal energy will be passed from the output 18 of the receiver via conductors 18A and 28, the wiper of switch #4, contact conductor 40 to junction 41 with conductor 27 and conductor 17A to the voice coil 17 of the station speaker, a portion of this same signal energy also being applied from said junction 41 via conductor 27 to the wiper of the #3 switch and thence via conductor 42 and the protective resistor $R_{14}$ for the voice coil, level control resistor $R_6$, and the drop side or winding of transformer $T_2$, which serves as the primary in this instance whereby the received signal is transferred into the hybrid network through the line side or secondary winding of $T_2$ and thence through the line side or winding 52 of the bridging transformer $2_1$ to be transferred from the drop winding 52A thereof via conductor 43 and the wiper and first contact of the #7 switch isolating resistor $R_{12}$, junction 45, conductor 30, and jack $J_3$ to the recorder input represented as the recording head 21R.

Thus, in the first position the bridging transformer functions to transfer the audio frequency component of the received radio signal from the hybrid network to the input of the tape recorder.

Assuming next that the station transmitter is in operation through the agency of one of the aforesaid on-off control expediencies, the usual speech input amplifier for the transmitter will receive the output of the microphone 19 via the cord patch and jack means 19A, $J_1$, conductor 39, the wiper and first contact of the #5 switch, conductor 46, transmitting jack $J_2$, and patch cord 20A to the transmitter, the aforesaid first contact of the #5 switch being connected via conductor 39A, a blocking capacitor $C_6$, the first contact and wiper of the #6 switch, conductor 30, recorder jack $J_3$, and patch cord 21A to the tape recording head.

In this latter transmitting and recording operation, the station equipment operates normally and both sides of the radio conversation can be recorded. It will be noted that any imbalance of the hybrid network produced by disconnection of the line in this position is of no concern, since the transformer $T_3$ is disconnected from the transmitter in this condition, the transmitter and the tape recorder receiving their inputs directly from the microphone as regards the transmitted portion of the recorded material, the received portion being impressed through the hybrid network, and the bridging transformer.

SECOND POSITION

*"Playback to transmitter"*

With all switch wipers turned clockwise to the second-position contacts, a recording can be used to modulate the transmitter and be monitored at the same time by the station loudspeaker, the output signals from the playback head 21P being passed to the voice coil via conductor 31, the wiper and second contact of the #8 switch, conductor 33 to the second contact and wiper of the #3 switch, and conductors 27 and 17A to the voice coil 17 of the speaker, these signals from the playback head at the same time being applied from said conductor 31 to junction 31A, conductor 32, the second contact and wiper of switch #7, conductor 43 to the drop winding of the bridging transformer, and thence from the line side of the latter into the hybrid network to energize the line winding of transformer $T_3$ and modulate the transmitter via the drop (here the secondary winding of $T_3$, conductor 34, junction 34A with the level-controlling voltage divider resistors $R_9$, $R_{10}$, conductor 35 to the second contact and wiper of switch #5, and thence via conductor 46 to the transmitter jack $J_2$ and transmitter plug and cord means 20A.

In this position the drop side of the transformer $T_2$ stands substantially unloaded and open, so that unbalance of the hybrid circuit because of the open line connection is again unimportant.

THIRD POSITION

*"Off"*

This setting may be regarded as the "all normal" condition in which the radio equipment, in particular, and the several patch units as well, operate independently, the microphone being connected with the transmitter under these conditions, and the loudspeaker being necessarily connected to the receiver output, such connections being effected by the #4 and #5 switches in third position, it being further observed that all of the wipers of the remaining selector switches stand on dead contacts in this third position.

The receiver output is fed via conductors 18A, 28, the #4 wiper and third contact, conductor 40 to junction 41 with speaker conductor 27 and voice coil conductor 17A, while the microphone at this time is connected to the transmitter via jack $J_1$, conductors 39, 39A, the third contact and wiper of the #5 switch, conductor 46 and transmitter jack $J_2$. The phone line and tape recorder are disconnected, as is the hybrid circuit.

FOURTH POSITION

*"Record line"*

On advancing into the fourth position, the #1 and #2 selector switches connect the phone line, the remote telephone subset connections to the terminal strip at terminals 16C and 16D being extended via conductors 50, 50A and 51, 51A respectively in series with radio frequency chokes $RFC_1$ and $RFC_2$ to the wipers of the #1 and #2 selector switches, capacitors $C_2$, $C_3$, $C_4$, $C_5$ being shunted across said conductors and chokes to provide a filter means preventing transfer of radio frequency energy from the phone patch into the hybrid network, the subset and telephone line being connected by the first two selector switches to the line side of the network via conductors 53 and 54 connecting into the network and with the line winding of the bridging transformer at the line input terminals 55, a non-polarized blocking capacitor $C_1$ (about 10 mfd.) being interposed in series with one of these conductors, e.g. 53, to prevent application of a direct current load to the telephone line.

Thus, in position four, the #1 and #2 selector switches connect the telephone subset and line with the line winding of the bridging transformer and therefore with the hybrid network, and signals from the telephone line can be recorded by transfer from the drop side 52A of the bridging transformer, conductor 43, the wiper and fourth contact of the #7 switch, conductor 44, resistor $R_{12}$, junction 45, and conductor 30, to recording jack $J_3$, the radio facilities operating normally and independently of the telephone line and recorder in this setting.

FIFTH POSITION

*"Patch/Record Station & Line"*

In the fifth position, as in the fourth last described above, the phone patch continues in effect with the telephone line connecting into the hybrid network at terminals 55 and the line side of the bridging transformer, but owing to circuit connections now set up by selector switches #4, #5, and #7 at their fifth contacts, a complete two-way telephone recording and station patch is effected with the output side of the radio receiver connecting via conductors 18A, 28, the wiper and fifth contact of the #4 switch, conductor 42 anr resistor $R_{14}$ into the drop side of the transformer $T_2$ and via the line winding 58 thereof into the network and into the telephone line via terminals 55, part of the same signal energy being transferred via the drop winding 52A of the bridging transformer and conductor 43, the wiper and fifth contact of the #7 switch, conductor 44, resistor $R_{12}$, junction 45, conductor 30 to the recording jack $J_3$.

In the case of signals from the telephone line, the circuit path to the recorder is as just described for the receiver signals in this position, from the line side of the bridging transformer.

Moreover, the same incoming telephone signals modulate the transmitter since a portion of the incoming energy arriving at the line side of the bridging transformer traverses the line winding 58 of tranformer $T_3$ the drop winding of which passes the signal to the transmitter via conductor 34, the fifth contact and wiper of the #5 switch, conductor 46, and transmitter pack $J_2$.

The efficiency of the hybrid network with respect to its bridge balance and selective transmission is such that although speech signals from the remote telephone will readily trip a properly adjusted voice-operated relay, so that the speech of the remote telephone party controls the transmitter when the signal is fed into the hybrid circuit from the line, the receiver signal fed into the hybrid circuit by transformer $T_2$ and out to the line for recording and transmittal does not feed to the transmitter through transformer $T_3$, so that the voice-operated relay is not actuated by this signal. As will be obvious, the level adjustments may readily be set to produce the same recording level for signals from both sources.

SIXTH POSITION

*"Playback to line"*

As in the case of the fourth and fifth positions, the phone patch continues, but in modified form, in the sixth and last selecting position with the connection of the telephone line into the hybrid coupling system through the #1 and #2 switches as previously described, it being noted that in this case the last or sixth contacts of switches #3 and #5 are dead, with the result that the radio facilities are wholly disassociated from the line and can be operated independently, while the playback head of the tape recorder is connected via conductor 31, junction 31A, conductor 32, the sixth contact and wiper of the #7 switch, conductor 43, the drop side (now serving as the primary) of the bridging transformer to the line side thereof and into the telephone line at line terminals 55, i.e., the operation is generally similar to that of the fourth position, except for reversal of the signal flow between the line and recorder.

In order to present a proper load in the sixth position to the output transformer (not shown) employed in the usual tape recorder, switch #8 is arranged to connect a resistance $R_{11}$ of about 3.3 ohms across the playback leads, this same resistance being connected as a standby load across the receiver output leads in the second position via conductor 60, the second contact and wiper of the #3 switch, and conductor 28.

The terminal or balancing network comprising resistors $R_7$ and $R_{13}$ can be adjusted when the coupling is first placed in operation to provide a null over a range of line impedance having a resistive component ranging from about 200 to 1800 ohms, resistor $R_7$ being variable for this purpose and having a screw-driver-type adjustment shaft brought out to provide an external null adjusting means 23 accessible at the rear panel of the cabinet (FIG. 1A).

The input level fed to the transmitter is adjustable at the front of the coupler by knob 14 which actuates the variable resistor $R_8$ (about 50K ohms) in the circuit from the drop side of transformer $T_3$, while the level of the output from the receiver is adjustable by knob 13, which actuates the variable resistor $R_6$ (about 10 ohms) in the drop side of the other transformer $T_2$. Once set, these two controls seldom need attention.

Resistors $R_9$ and $R_{10}$ are of relatively high value (e.g. about 150K and 15K ohms respectively) to form a voltage divider which will determine a proper level to the speech input amplifier when the selector switch means is in the second position for playback to the transmitter.

In the event the receiver input control 13 ($R_6$) is turned all the way down, the protective resistor $R_{14}$ in lead 42 (about 3.3 ohms) prevents shorting out the receiver voice coil.

The resistor $R_{12}$ (about 0.47 megohm) in conjuction with capacitor $C_6$ (.001 mfd.) in the circuit of the #6 selector switch is employed to prevent applying a relatively low impedance load, represented by the drop side of the bridging transformer, to the high impedance microphone, in the first position.

The resistors $R_1$, $R_3$ in the T-pad attenuating means have values, respectively, of about 330 ohms, while $R_2$ has a value of about 470 ohms, the attenuation provided being of the order of about 10 db and serving to isolate the hybrid section from the telephone line, the impedance thus presented to this line being constant over the speech frequency range.

Because of the particular circuit terminating and switching arrangement disclosed, in the several different circuit conditions (e.g. positions 1 to 4 and 6) in which the telephone line may stand disconnected or in which one or more of the hybrid-connected transformer windings is disconnected or effectively unloaded, thus causing imbalance in the isolating bridge, such imbalance will be of no consequence and no rebalancing problems exist as a result of the radical changes effected in switching through the wide selection of equipment patches and combinations afforded by the coupler for the reason that the programming of the circuit combinations and changes in the switching pattern is such that in those instances in which the loading or connection to any of the hybrid windings is changed to cause some kind of imbalance as aforesaid the circuitry is also contrived to present at that time no condition in which disturbance of the null balance would be objectionable.

It should be further observed that readjustments in general are minimized by the arrangement of the controls and attenuating means, for example, the hybrid level adjusting resistors $R_6$ and $R_8$ are connected across the hybrid drop windings in a way to minimize disturbance of the impedance in those conditions in which matching is required, and such variations in impedance as may occur in the hybrid network in position 5, for example, are rendered of no practical consequence by the attenuating or isolation means $R_1$, $R_2$, $R_3$.

Moreover, the arrangement of the voltage-dividing resistors $R_9$, $R_{10}$, relative to the speech input of the transmitter, is such that once a suitable signal level has been selected for the output of the recorder with respect to the telephone line, the signal level with respect to the transmitter is automatically correct and no readjustment will be necessary in playing back to the transmitter.

The resistors $R_4$ and $R_5$ have values of about 300 ohms and 1200 ohms respectively and cooperate with the series-connected resistors $R_7$ and $R_{13}$ (totalling from 470 to 670 ohms, depending upon the setting of $R_7$) and the input resistance formed by the isolating T-network $R_1$, $R_2$, $R_3$, as affected by the line resistance and impedance for which adjustment of $R_7$ is made, to form, for voltages originating in $T_2$, a Wheatstone bridge in which the transformer $T_3$ is connected across the null junction between the equal voltage-division points at the connection between the arm $R_7$, $R_{13}$, and the arm $R_5$ and the connection between the arm $R_4$ and the arm consisting of the parallel combination of the T-network, the line and the transformer $T_1$ (the latter having little effect). It will of course be observed that the balance is destroyed when the line is disconnected in positions 1, 2, and 3 of the switch, but the condition of balance is of no concern in these positions, since the transmitter is controlled directly by the microphone in position 1, any input to transformer $T_3$ producing no effect, while in position 2 the transformer $T_2$ is disabled by the switch, so that no spurious signal to $T_2$ can be produced by the imbalance, and, of course, the imbalance is of no possible concern in position 3. The employment of the unbalanced hybrid network for the playback to the transmitter with the bridging transformer for the tape recorder permanently installed across the exterior line connection of the hybrid network produces great simplification of construction as compared with other methods of making the same kind of operative connections.

The utility of the device illustrated and described will be readily appreciated from an understanding of the foregoing description of its structure and mode of operation, and the improvements provide an accessory device having a flexibility of operation heretofore unknown.

In addition to permitting patching to the phone line and recording the entire operation of the station (receiver and transmitter) with or without the phone-line patch, the illustrated construction permits the recording of an incoming phone message or of a two-way phone conversation while the receiver and transmitter are in normal operation and unconnected to the line or the recorder.

Thus, when the station is busy, an incoming phone message intended to be relayed to another station may be recorded and subsequently relayed to its destination from the transmitter when the latter is no longer otherwise engaged.

Additionally, if the phone is busy, an incoming message intended for telephone transmission can be stored by recording and then played back to the phone line at a later time, when the phone is not occupied otherwise.

Heretofore, the relaying of messages between the telephone and the inter-station radio link in either direction has required that neither the phone link nor the radio transmission link be otherwise occupied, whereas now use of the novel phone-patch accessory permits "stacking" of messages in either direction in the tape recorder when the outgoing portion of the over-all link is temporarily engaged otherwise, thus tremendously increasing the message handling capability of the station without substantial addition to the cost of operation.

Persons skilled in the art will readily devise coupling circuits substantially differing in details of construction and operation from that herein illustrated which neverthless utilize the teachings of the invention. Some modifications and variants will be immediately obvious, while others will become apparent after study. Accordingly, the scope of the protection to be afforded the invention should not be considered as limited by the particular embodiment herein disclosed, but shall extend to the structures as described in the appended claims and equivalents thereof.

What is claimed is:

1. A hybrid coupler for selectively effecting circuit patches and interconnections between a plurality of speech transducing and transmission instrumentalities and loads and a telephone line and subset, said coupler including a hybrid network comprising a pair of hybrid-connected transformers each having a line winding and a drop winding, said line windings being connected in series in a bridge-balanced resistive network to line-terminal means adapted to be connected with said line and subset, said drop windings being adapted to be selectively connected in predetermined selected combinations with predetermined transducer and signal-source loads and instrumentalities as aforesaid; load-coupling terminal means adapted for operative connection with said loads and instrumentalities; a bridging transformer having a line winding and a drop winding, said line winding connected in shunt across said line terminal means such that all of the aforesaid line windings are in closed-circuit series connection in said bridge-balanced network; and switchng and circuit-connecting means operatively connecting with said load-coupling terminal means and each of said drop windings and operable to interconnect certain of the transducer and signal-source loads and instrumentalities, which are connected to said load terminals, selectively in predetermined cooperative circuit combinations with substantial matching of impedances over the speech frequency range between the interconnected loads and instrumentalities, including the telephone line and subset in such of said combinations as include the same.

2. Hybrid coupling apparatus according to claim 1 further characterized by the provision of cross-over network means affording two conductive paths of different predetermined ohmic resistance cross-connecting the terminals of the line windings of the hybrid-connected transformer, whereby to limit transfer of speech energy between said line windings of the hybrid transformers over one of said cross-over paths and permit such energy transfer between one of said line windings and the line winding of the bridging transformer over the other of said cross-over paths.

3. Hybrid coupling apparatus according to claim 1 in which there is interposed a resistive attenuating means in the hybrid-network circuit path between the line winding of the bridging transformer and the line windings of the hybrid-connected transformers, said attenuating means being of a predetermined ohmic value and of a series-shunt T configuration in said hybrid-network path to substantially isolate the telephone line and subset from the hybrid network beyond said line winding of the bridging transformer in any of the selective combinations aforesaid which shall include said telephone line and subset, while presenting a substantially constant impedance over the speech-frequency range.

4. Hybrid coupling apparatus as set forth in claim 1 further characterized in that a T-pad attenuating means of predetermined attenuation value is interposed in the circuit between the line winding of the bridging transformer and the hybrid network, the line windings of said hybrid-connected transformers are joined by a terminating resistance in series therewith, and the circuit path through each of the line windings of said hybrid-connected transformers and the appertaining circuit paths therefrom through said terminating resistance are respectively shunted by conductive means of predetermined ohmic character in each instance, whereby the hybrid network is isolated from said line terminal means, and cross-feeding of energy from one of said hybrid-connected transformers to the other is prevented.

5. Apparatus according to claim 4 further characterized by the provisions of level-adjusting attenuating means in circuit with each of the drop windings of the hybrid-connected transformers, together with means for adjusting the resistive value of said terminating resistance for the purpose of procuring a null balance in the hybrid network.

6. In a hybrid coupler, hybrid circuit means comprising: three transformers each having first and second windings, the first windings of each being connected consecutively one after another in a series circuit which is closed through a terminating resistive means of adjustable ohmic value constituting a null-balancing resistance, that one of the series-connected windings which is intermediate the other two in the series constituting the line winding of a bridging transformer, and the remaining two of the series-connected first windings constituting the hybrid-connected windings of input and output transformers, the second windings of each said transformer respectively constituting load-coupling windings; resistive attenuating means of T-pad configuration interposed in series-parallel connection in the circuit path between the line winding of the bridging transformer and the remaining two first windings; resistive means cross-connecting the terminals of said first windings and providing a cross-over network limiting the transfer of energy through the hybrid circuit means from one of said first windings to the other while passing energy from and to the respective hybrid-connected windings to energize and be energized by the line winding of the bridging transformer; means providing a plurality of load terminals adapted for connection with predetermined load circuits and instrumentalities of predetermined impedance characteristics; and selectively operable circuit-changing means having connection with said load terminals and with the load-coupling windings of each transformer and operable in different predetermined selective conditions to effect predetermined cooperative interconnections between certain of the load circuits and instrumentalities connected to said load terminals, said balancing resistance being adjustable to procure a predetermined null-condition with respect to energy from one of said load circuits or instrumentalities to another in at least one of said selective conditions, and to effect in conjunction with all of said transformers a substantial match in impedance between all of the loads and instrumentalities interconnected by said coupler in any of said selective conditions.

7. Circuit patching and coupling means comprising: a hybrid network having three transformer line windings connected consecutively in series in a network circuit closed by a terminating resistance of adjustable ohmic value, a first conductive resistance means connected in a by-passing circuit path around the first of said windings and the terminating resistance in series therewith; a second conductive resistance means connected in a by-passing circuit path around the third of said series-connected windings and the terminating resistance in series therewith, said by-passing paths each limiting the transfer of energy originating in either of said first or third primary windings to the other thereof to a degree suppressing cross-talk at predetermined energy levels between said first and third primary windings through said network while permitting substantial transfer of energy between either the first or third primary windings and the second said winding; means providing a plurality of coupling terminals adapted to have load and source circuits of predetermined impedance character connected thereto; a drop winding inductively associated with each said line winding; level adjusting circuit means connecting with at least the first and third of said drop windings; circuit-changing means having a plurality of selective circuit-changing conditions an circuit connections with said drop windings and said coupling terminals and operative in certain selective circuit-changing conditions to interconnect certain of said load and source circuits connected to said terminal means in predetermined circuit arrangements with said drop windings with substantial impedance match between the thus interconnected windings and circuits.

8. A selective coupler for attachment to a receiver output, a transmitter input, a phone line, a recorder input and a recorder output, the coupler having (a) respective terminals for the connection of said elements,
(b) a hybrid circuit having a receiver output circuit element and a transmitter input circuit element,
(c) a line pair coupled to the hybrid circuit for impressing signals thereon and receiving signals therefrom,
(d) a recorder-coupling element across the line pair, and
(e) switching means having a first position in which the line pair is coupled to the phone line terminals, the recorder-coupling element is coupled to the recorder input terminals and the receiver output and transmitter input elements are coupled to the receiver output and transmitter input terminals, respectively, the hybrid circuit being balanced in this position to isolate the receiver output and transmitter input, so that the phone line receives signals from the receiver output terminals and impresses signals on the transmitter input terminals to patch the phone line to the receiver and transmitter for two-way communications recorded by the recorder, and a second position in which the line pair is decoupled from the phone line terminals, the recorder-coupling element is coupled to the recorder output terminals, the transmitter input element is coupled to the transmitter input terminals and the receiver output element is decoupled from the receiver output terminals, so that the recorder signal is impressed on the transmitter input and the transmitter input remains unaffected by the receiver output despite the unbalance of the hybrid circuit produced by decoupling of the phone line.

9. The coupler of claim 8 having a third switch position in which the phone line terminals are coupled to the line pair and the recorder-coupling element is coupled to recorder terminals, the receiver output and transmitter input elements being decoupled from their respective terminals, so that the phone line is coupled only to the recorder, and the receiver and transmitter are operable independently of both.

10. The coupler of claim 9 wherein the recorder terminals coupled to the recorder-coupling element in said third switch position are the recorder input terminals so that the recorder records from the line, the recorder output terminals being decoupled from the circuit, and having a fourth position in which the coupled and decoupled conditions of the recorder input and output terminals of the third position are reversed, so that the recorder may impress a message on the line.

11. The coupler of claim 10 having a fifth switch position in which the phone line terminals are decoupled from the line pair, the recorder-coupling element is coupled to the recorder input terminals, the receiver output element is coupled to the receiver output terminals, and the transmitter input terminals are coupled to the recorder input terminals, both being decoupled from the transmitter input element, so that the transmitted and received signals are impressed on the recorder input and the transmitter input remains unaffected by the unbalance of the hybrid due to the disconnection of the phone line.

12. A phone-patch coupler for use with a receiver, a transmitter and a tape recorder having terminals for the connection thereof and having a first switching position in which a tape recorder output element is connected to the phone line and the transmitter input is decoupled from both, a second switching position in which the tape recorder output element is coupled to the transmitter input and the phone line is disconnected, and a third switching position in which the phone line is coupled to the transmitter input, the tape recorder coupling to the transmitter in the second position being the same as the phone line coupling to the transmitter input in the third position with the addition of a voltage divider, so that proper signal level to the transmitter and the line from the recorder and to the transmitter from the line are obtained in the respective switching positions without adjustment of controls other than the switch.

13. A phone-patch coupler for use with a receiver, a transmitter and a tape recorder, said coupler having a hybrid network in balance when connected to a phone line and including a receiver output connection and a transmitter input connection isolated from the receiver output by such balance and having line leads for connection to a phone line, a recorder connection connected across the line leads, and switching means having a first position connecting the phone line to the line leads for two-way communication through the receiver and transmitter with the recorder in circuit with the receiver output and transmitter input and a second position disconnecting the phone line from the line leads and disabling one of said receiver output and transmitter input connections for connection of the recorder to only one of said connections, the other of said receiver and transmitter being coupled to the recorder by means independent of the hybrid network, so that the receiver output is isolated from the transmitter input despite unbalance of the hybrid network due to disconnection of the phone line.

14. The coupler of claim 13 wherein said transmitter input connection to the hybrid network is disabled in said second position, the receiver output being coupled to the recorder input through the hybrid circuit and the line leads and the transmitter input being coupled to the recorder input by means independent of the hybrid circuit.

15. A phone patch accessory for use with a receiver output, a transmitter input, a phone line, and a recorder input and output comprising terminals for connection of said inputs, outputs and line, and switching means having a first position coupling the receiver output terminals and the transmitter input terminals to the line terminals, a second position decoupling the line terminals from the receiver and transmitter terminals and coupling the line terminals to the recorder input terminals, and a third position decoupling the line terminals from the receiver and transmitter terminals and coupling the line terminals to the recorder output terminals, whereby the phone line and the receiver and transmitter may be connected as links for two-way communications, and incoming communications in either direction may be stored while either link is otherwise engaged.

16. A phone patch accessory for use with a receiver, a transmitter, a phone line, and a recorder comprising:

(a) a Wheatstone bridge comprising four resistance arms, one of said arms comprising one pair of terminals of a four-terminal resistive isolating network, and input-from-receiver and output-to-transmitter elements connected between respective alternate junctions, the bridge being in balance when the other pair of said terminals is connected across the phone line, (b) a recorder-coupling element connected across said other pair of terminals, and (c) switching means having a first position connecting the line to said other pair of terminals, the receiver to said input element and the transmitter to said output element and further positions selectively opening and closing said connections, at least one of said receiver and transmitter connections being open in all positions wherein the line connection is open.

References Cited by the Examiner

UNITED STATES PATENTS

| | | | |
|---|---|---|---|
| 1,432,354 | 10/1922 | Nottage | 179—170 |
| 2,812,388 | 11/1957 | Thomas | 179—170 |
| 2,928,898 | 3/1960 | Salzberg et al. | 179—6 |

HERMAN KARL SAALBACH, *Primary Examiner.*